United States Patent Office 3,040,013
Patented June 19, 1962

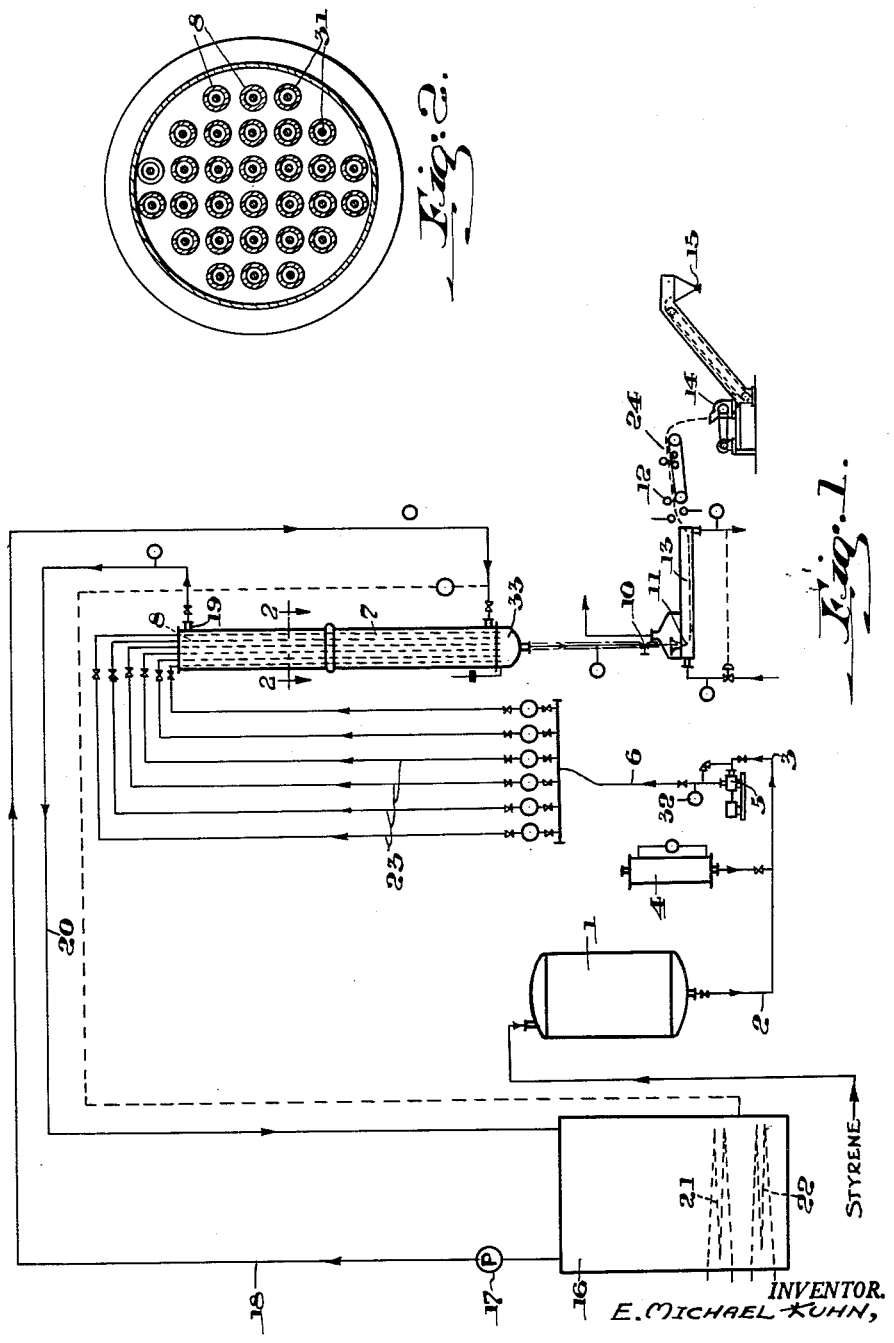

3,040,013
UNSATURATED ORGANIC COMPOUNDS
Eugene Michael Kuhn, Verona, Pa., assignor to Koppers Company, Inc., a corporation of Delaware
Filed Dec. 17, 1957, Ser. No. 703,363
3 Claims. (Cl. 260—93.5)

This invention relates generally to a novel method of producing vinyl aromatic polymers of low molecular weight and, more particularly, to the production of low molecular weight polymers and copolymers by bulk polymerization.

Polymers and copolymers of low molecular weight are used commercially for blending with high molecular weight polymers to produce a resulting blend with desirable molding properties, namely, faster flow, i.e. low viscosity, and more rapid set up, i.e. less time to reach a dimensionally stable form, than the high molecular weight polystyrene. Additionally, a blend of this type eliminates the need for lubricants and plasticizers commonly used.

The physical and mechanical properties of vinyl aromatic resins, e.g., polystyrene and its copolymers, depend to a great extent upon the molecular weight of the resin. In turn, the molecular weight of the resin of any selected monomer depends upon conditions under which the polymerization reaction that forms the resin is performed.

The various methods employed heretofore for controlling the molecular weight of vinyl aromatic resins have involved raising the temperature at which the polymerization is carried out, increasing the rate of polymerization by the use of specific catalysts such as peroxides and acids, and carrying out the reaction in the presence of a solvent for the reacting material. But each method has involved one or more undesirable conditions. For example, increasing the temperature or rate of reaction is undesirable since careful control of the strongly exothermic polymerization reaction is required to keep the reaction from occurring violently or resulting in the formation of a discolored product of non-uniform quality. The employment of a solvent, on the other hand to dilute the reaction mixture, substantially reduces the rate of reaction and may also lower the average molecular weight of the product to an undesirable level.

I have found that the desired polymers and copolymers can be prepared in a continuous fashion without critical and exacting temperature controls by polymerizing the vinyl monomers in a sample polymerization zone which is surrounded by a heat exchange zone running the entire length of the polymerization zone and without the need of provisions for detecting local overheating in any part of the polymerizing zone. In accordance with the invention, the temperature of the heat exchange medium flowing through the heat exchange zone remains relatively constant without additional corrective cooling along the path of flow of the polymerizing monomer; monomers can be polymerized in thin streams, i.e. one-eighth to three inches in diameter, of various lengths within broad operating ranges of temperature and residence times; and the temperature of the circulating fluid may vary within the range of about 180° to 260° C. and still produce excellent results; the preferred temperatures, however, are in the range of from about 230° to 250° C. The pressure is not critical and may vary from 100 to 250 p.s.i.g. Residence time of the monomer in the reactor ranges broadly between 0.25 and 2 hours, and, to some extent, depends upon the length of tube used.

According to the invention, the monomer polymerizes in comparatively inexpensive apparatus devoid of costly heat control devices to produce low molecular weight polymers, i.e. from 20,000 to 30,000 without discoloration and of uniform quality. This invention is in sharp contrast to the processes heretofore known which require expensive and elaborate apparatus to produce a non-discolored polymer of uniform properties. My continuous thermal polymerization process, in terms of the art, can be allowed to go out of control and still produce a product of the desired properties, contrary to the prior knowledge of those skilled in the art.

Polymerization in accordance with the process of this invention and employing the novel reactor of this invention involves pumping a monomer such as styrene continuously into one end of the reactor, extruding the thermally polymerized low molecular weight polymer at the other or discharge end of the reactor, and pulling the extruded filament through a water bath where it is cooled. Heat to the reactor during the polymerization is provided by circulating through a heat exchange zone of the reactor a liquid at a temperature of from 180° to 260° C. and at a rate sufficient to maintain a desired operating temperature.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike:

FIGURE 1 shows as an embodiment of the invention a schematic flow diagram of the polymerization reactor and associated equipment;

FIGURE 2 is a cross-sectional view along the line 2—2 of FIGURE 1;

Figure 3:
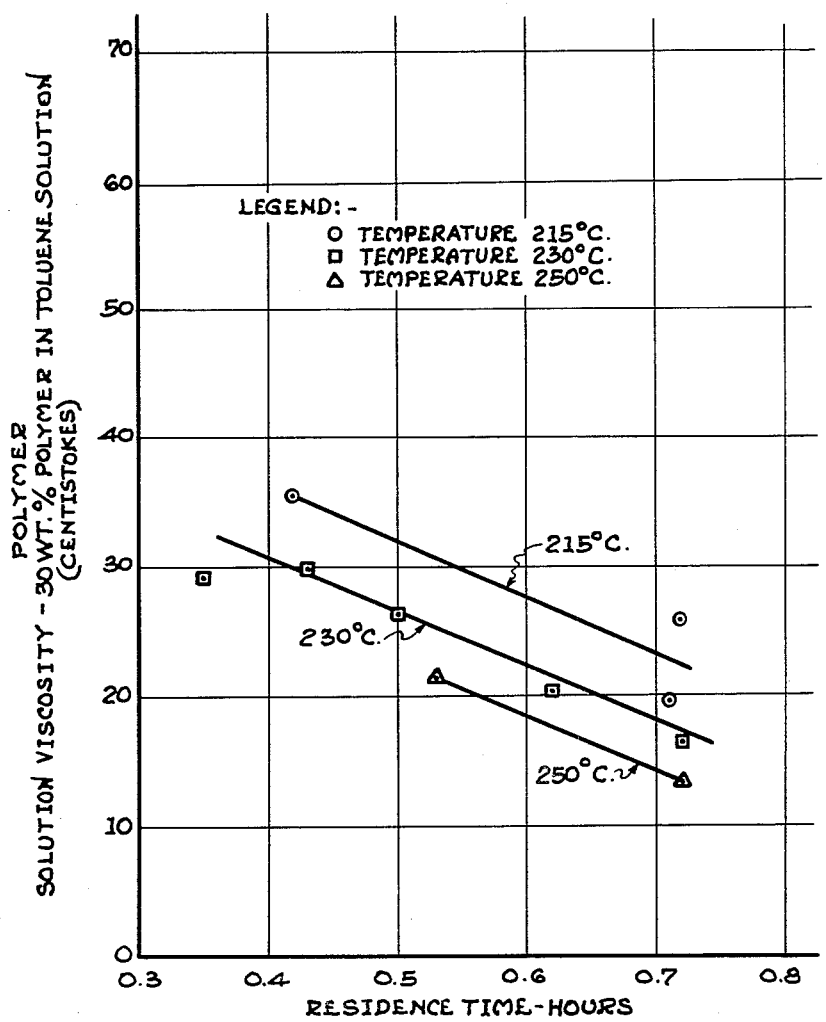
FIGURE 3 is a plot of the residence time against the solution viscosity at three selected temperatures.

In the novel apparatus of FIGURE 1, monomer feed stock flows from stock tank 1, past metering tank 4, through line 2, and valve 3 to pump 5. Pump 5 feeds the monomer through line 6 past accumulator 32 which compensates for any pulsation in the pumps to feed equalizing lines 23. The feed equalizing lines 23 are manually set to obtain the same amount of throughput per unit time in each of them. The monomer thence flows to the reactor 7 where it enters the polymerizing tubes 8 of the reactor 7. Polymerization of the monomer in the polymerizing tubes 8 is thermally instituted by the heat exchange agent flowing through the reactor 7. The monomer is thermally polymerized by flowing downwardly through the polymerizing tubes 8 which discharge into common head 33, and there is extruded from the bottom of the reactor at orifice 10 in the form of a continuous filament. The extruded polymer filament 11 is pulled by rollers 12 through water bath 13 into a crusher 24, thence to grinder 14 whence it is discharged at 15.

Any of the known heat exchange agents, such as Dowtherm A, a mixture of diphenyl and diphenyl oxide manufactured by Dow Chemical Co., or Mobiltherm Oil Light, an oil produced by Socony Mobil Oil Co., which function at the operating temperatures of the process may be used. The heat exchange agent is stored in tank 16. The heat exchange agent is pumped by pump 17 from tank 16 through line 18 to the lower portion of the reactor 7. The heat exchange agent flows up through reactor 7 and discharges at port 19 from whence it returns through line 20 to storage tank 16. The heat exchange agent is maintained at the desired temperature by heaters 21 and 22 located in storage tank 16.

A plurality of polymerizing tubes 8, FIGURE 2, are located within the reactor 7 in a manner such that the heat exchange agent comes into intimate contact with them throughout their entire length.

Advantageously, the polymerizing tubes 8 may be constructed of 1¾" annealed type 316 stainless steel tubing or equivalent such as type 304; may have a wall thickness of .035 and may contain a thermocouple well 31.

The apparatus and method of the invention may be applied advantageously to the polymerization of any unsaturated organic liquid which can be polymerized to a low molecular weight liquid or thermally stable fusible resinous polymer. It is particularly useful in polymerizing monomeric or partially polymerized vinyl compounds such as vinyl aromatic hydrocarbons and their derivatives. Examples of vinyl aromatic compounds which may be polymerized in the method of the invention to obtain polymers of lower molecular weight are styrene, ortho-methyl-styrene, para-methyl-styrene, meta-ethyl-styrene, para-iso-propyl-styrene, ortho-chloro-styrene, para-chloro-styrene, divinylbenzene, vinylnaphthalene, etc. Also within the scope of this invention is the preparation of copolymers of styrene and its derivatives including, for example, copolymers with alpha-methyl-styrene, divinylbenzene, and with other unsaturated compounds such as acrylonitrile, methyl methacrylate, ethyl acrylate, etc.

The invention is further described in greater detail by the following examples which are given by way of illustration and not by way of limitation. All parts and percentages are by weight unless otherwise specified.

The following examples were conducted in a 3.5 foot single tube reactor:

| Conditions | Ex. 1 | Ex. 2 | Ex. 3 |
|---|---|---|---|
| Styrene Feed Rate, gms./hr | 1,700 | 1,700 | 1,700 |
| Residence Time in Reactor, hr | 0.73 | 0.73 | 0.73 |
| Dowtherm Temperature Entering Reactor Jacket, ° C | 200 | 230 | 250 |
| Reactor Pressure, p.s.i.g | 135 | 135 | 135 |
| Product: | | | |
| Methanol Insolubles | 85.1 | 81.3 | 80.2 |
| Relative Viscosity (1 gm./100 ml. Toluene) | 1.23 | 1.19 | 1.15 |
| Softening Point ° C. (Ring and Ball) | 125 | 116.5 | 113.5 |
| Residual Monomer, Percent | 2.5 | 1.7 | 1.5 |

These three examples shows the effect of temperature on the product, the lower temperature yielding a product of higher residual monomer content, higher softening point and higher percentage of methanol insolubles.

In the following examples, the polymerization was conducted in a single ten-foot, 1½" tube reactor:

| Conditions | Ex. 4 | Ex. 5 | Ex. 6 |
|---|---|---|---|
| Styrene Feed Rate, lbs./hr | 10.4 | 10.5 | 10.5 |
| Residence Time in Reactor, hrs | .74 | .72 | .72 |
| Dowtherm Temperature Entering Reactor Jacket, ° C | 200 | 230 | 250 |
| Reactor Pressure, p.s.i.g | 170 | 170 | 160 |
| Product: | | | |
| Methanol Insolubles, Percent | 88.9 | 81.5 | 78.4 |
| Solution Viscosity 30% in Toluene (Centistokes) | 56.1 | 21.3 | 13.7 |
| Softening Point, ° C. (Ring and Ball) | 132 | 117 | 109 |
| Residual Monomer, Percent | 5.3 | 2.2 | 2.0 |

These examples also show the effect of various polymerization temperatures, the lowest temperature yielding the product highest in residual monomer content, highest percent of methanol insoluble material, greatest solution viscosity and highest softening point. Additionally, a comparison of the results obtained in these examples demonstrates that the practice of the invention is independent of the tube length of the reactor.

Examples 7 and 8 were also conducted in the ten foot single tube reactor:

| Conditions | Ex. 7 | Ex. 8 |
|---|---|---|
| Styrene Feed Rate, lbs./hr | 14.4 | 5.8 |
| Residence Time in Reactor, hrs | .53 | 1.32 |
| Dowtherm Temperature Entering Reactor Jacket, ° C | 250 | 250 |
| Reactor Pressure, p.s.i.g | 200 | 160 |
| Product: | | |
| Methanol Insolubles, Percent | 84.3 | 73.5 |
| Solution Viscosity 30% in Toluene (Centistokes) | 21.6 | 12.3 |
| Softening Point, ° C. (Ring and Ball) | 121 | 105 |
| Residual Monomer, Percent | 2.1 | 1.4 |

These examples show the effect of variation in residence time, the longer residence time yielding a product containing less methanol insoluble material, lower solution viscosity, lower residual monomer content and lower softening point.

Examples 9 and 10 were conducted in a single ten-foot reactor:

| Conditions | Ex. 9 | Ex. 10 |
|---|---|---|
| 80/20 weight Mixture of Styrene-n-butyl-methacrylate, lbs./hr | 3.8 | 3.8 |
| Residence Time in Reactor, hrs | 2.0 | 2.0 |
| Dowtherm Temperature Entering Reactor Jacket, ° C | 180 | 200 |
| Reactor Pressure, p.s.i.g | 200 | 200 |
| Product: | | |
| Methanol Insolubles, Percent | | |
| Solution Viscosity, 30% in Toluene (Centistokes) | 57.7 | 37.6 |
| Softening Point, ° C. (Ring and Ball) | 116 | 112 |
| Residual Monomer, Percent | 3.5 | 2.4 |

These examples are illustrative of the fact that the invention is also useful in the production of copolymers. These examples show that, with constant residence time, lower temperatures yield a product having a greater solution viscosity, higher softening point and higher residual monomer content than the product from higher temperatures.

Example 11 was conducted in a fifteen tube 18 feet commercial type reactor:

Conditions: Ex. 11
- Styrene feed rate, lbs./hr./tube _____ 20
- Residence time in reactor, hrs _____ 0.75
- Oil temperature entering reactor shell, ° C ____ 235
- Reactor pressure, p.s.i.g _____ 200

Product:
- Methanol insolubles, percent _____ 84.5
- Solution viscosity, 30 percent in toluene (centistokes) _____ 28
- Softening point, ° C. (ring and ball) _____ 125
- Residual monomer, percent _____ 1.4

It is obvious from the examples that the rate of flow may vary widely, from about 3.7 to about 20 pounds of styrene per hour per tube.

Figure 4:
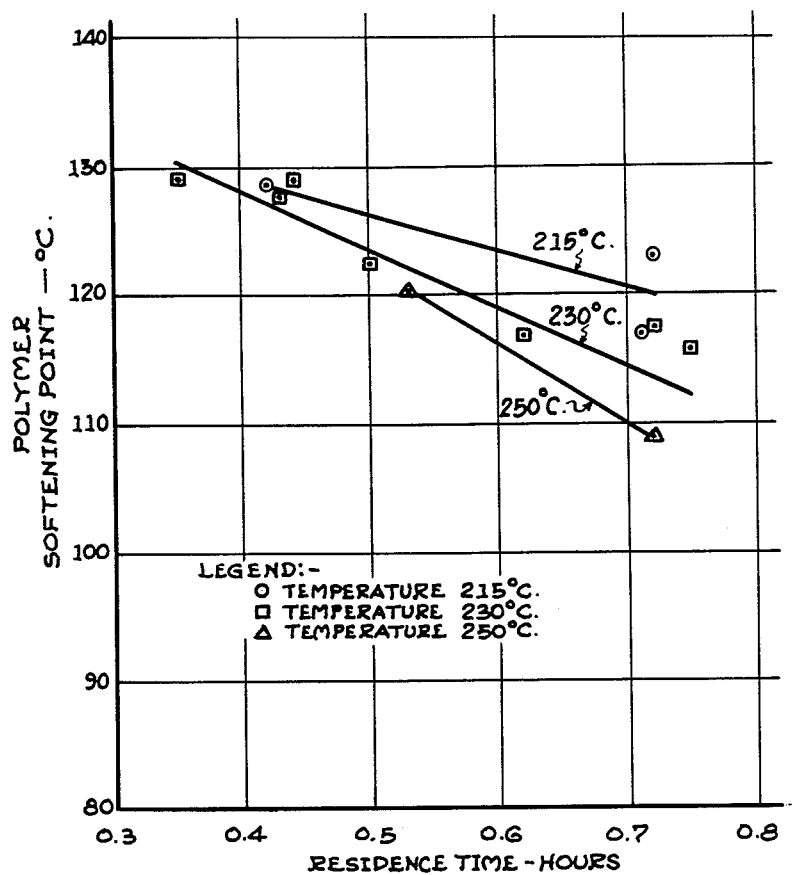
FIGURE 4 is a plot of the residence time against the softening point.
Figure 5:
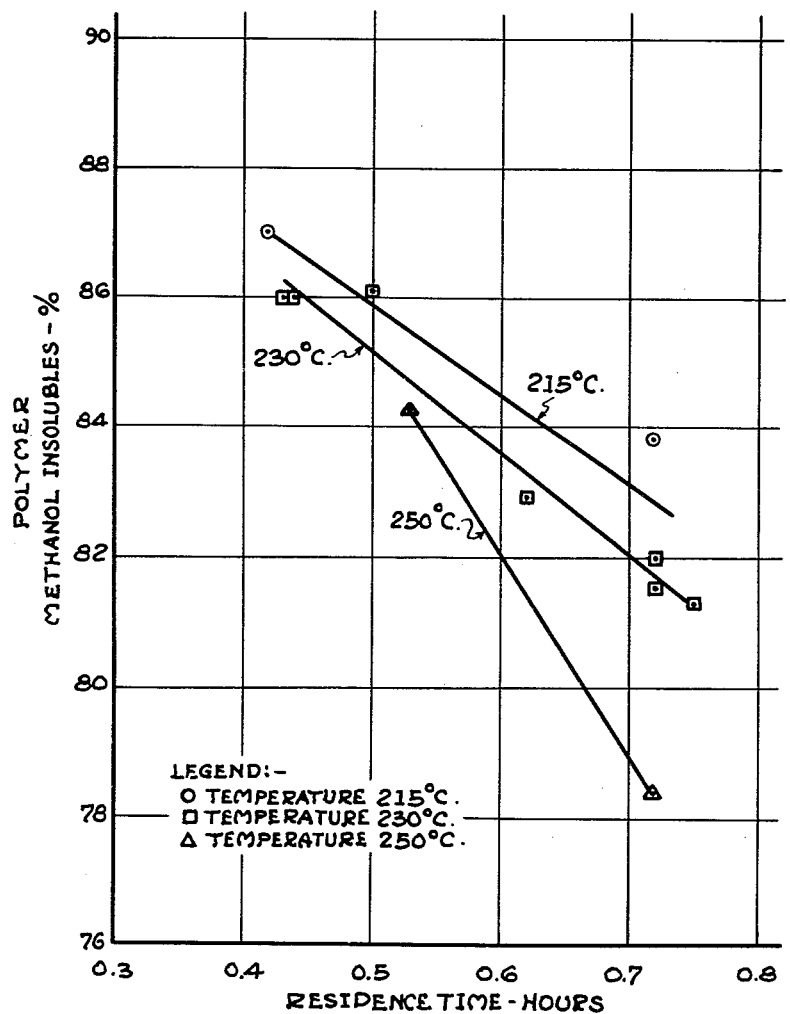
FIGURE 5 is a plot of the percentage methanol insolubles versus residence times at selected polymerization temperatures.

FIGURES 3, 4, and 5 graphically illustrate the various properties which may be obtained by polymerizing styrene under various conditions. In a ten-foot reactor, for example, if the temperature of the heat exchange medium is kept at 230° C. and a residence time of 0.5 hour is used the product obtained has a solution viscosity of 26, a softening point of 124 and 85 percent methanol insolubles. If the heat exchange medium is kept at a temperature of 250° C. and a residence time of .72 hour is used the product will have the following properties:

- Methanol insolubles _____ percent __ 78.5
- Softening point _____ ° C __ 109
- Solution viscosity _____ 13

Similar relations may be shown for other lengths of reactors and other monomers. It is thus apparent that my invention yields products which are commercially desirable for the blending with other polymers to meet widely varying end use specifications, and the reaction conditions are readily varied to yield a product of the desired properties for the particular application intended.

What is claimed:

1. A process for the continuous polymerization of styrene comprising: heating under pressure at least one moving stream of styrene, said stream having a diameter no greater than three inches, maintaining said streams at temperatures of between 180° C. and 350° C. and a pressure of between 100 and 260 p.s.i.g. at a rate of about 3.7 to about 20 pounds per hour per stream for a period of from 0.25 to 2 hours to polymerize substantially completely said styrene to polystyrene of a molecular weight of from 30,000 to 50,000 recovering said polystyrene and cooling said polystyrene to a maximum temperature of 240° C.

2. A process for the polymerization of polymers of styrene which polymerize exothermically comprising: heating under pressure at least one moving stream of monomer, said stream having a diameter no greater than three inches, maintaining said streams at temperatures of between 180° C. and 350° C. and a pressure of between 100 and 260 p.s.i.g. at a rate of about 3.7 to about 20 pounds per hour per stream for a period of from 0.25 to 2 hours to polymerize substantially completely said monomer to a polymer of styrene of molecular weight of from 20,000 to 50,000, recovering said polymer and cooling said polymer to a maximum temperature of 240° C.

3. A process, in a closed polymerization zone which is substantially surrounded by an enclosed heat exchange zone through which a heat exchange medium is circulated, said polymerization zone having a diameter no greater than three inches, for effecting the polymerization of monomeric styrene which polymerizes exothermically comprising: flowing said styrene, without otherwise agitating, at a rate of about 3.7 to about 20 pounds per hour per stream through said polymerization zone while simultaneously heating said styrene to a temperature between about 180° C. and 350° C. by causing said heat exchange medium to contact said polymerization zone, maintaining the temperature between about 180° C. and 350° C. by circulating said heat exchange medium through said heat exchange zone, controlling the pressure of said styrene between 100 and 260 p.s.i.g., controlling the residence time of said styrene in said polymerization zone to a period of between 0.25 and 2 hours thereby producing a substantially completely polymerized polymer having a molecular weight of between 30,000 and 50,000, withdrawing said polymer from said polymerization zone and cooling said polymer to a maximum temperature of 240° C.

References Cited in the file of this patent

UNITED STATES PATENTS

| | | |
|---|---|---|
| 2,283,539 | Collings et al. | May 19, 1942 |
| 2,378,138 | Gaylor | June 12, 1945 |
| 2,520,424 | Mills et al. | Aug. 29, 1950 |
| 2,659,717 | Park | Nov. 17, 1953 |
| 2,714,101 | Amos et al. | July 26, 1955 |
| 2,727,884 | McDonald et al. | Dec. 20, 1955 |

OTHER REFERENCES

Blajnikoff: Plastic–233, July 1942. (Copy in Div. 60.)

Kline: Modern Plastics, vol. 25, pages 131–133, November 1947.

Dunlop et al.: Ind. Eng. Chem., vol. 40, pp. 654–660, 1948.

Boundy-Boyer: "Styrene, Its Polymers, Copolymers and Derivatives," pp. 902–907, Reinhold Pub. Co., New York (1952). (Copy in Scientific Library.)

UNITED STATES PATENT OFFICE

CERTIFICATE OF CORRECTION

Patent No. 3,040,013                                              June 19, 1962

Eugene Michael Kuhn

It is hereby certified that error appears in the above numbered patent requiring correction and that the said Letters Patent should read as corrected below.

Column 1, line 48, for "sample" read -- simple --; column 6, line 2, for "at a rate of about 3.7 to about 20 pounds per hour" read -- at a flow rate of between about 3.7 and 20 pounds per hour --; line 3, strike out "per stream".

Signed and sealed this 18th day of December 1962.

(SEAL)
Attest:

ERNEST W. SWIDER
Attesting Officer

DAVID L. LADD
Commissioner of Patents